United States Patent [19]
Graham et al.

[11] Patent Number: 4,593,194
[45] Date of Patent: Jun. 3, 1986

[54] OPTICAL ENCODER WITH DIGITAL GAIN COMPENSATION CONTROLLING SOURCE INTENSITY

[75] Inventors: Randolph H. Graham, San Jose; Joel N. Harrison, Campbell, both of Calif.

[73] Assignee: Quantum Corporation, Milpitas, Calif.

[21] Appl. No.: 538,811

[22] Filed: Oct. 5, 1983

[51] Int. Cl.[4] ............................................. G01D 5/34
[52] U.S. Cl. ................................ 250/231 SE; 250/205
[58] Field of Search ........... 250/20 S, 231 SE, 237 G, 250/209; 340/347 P; 315/158; 324/175

[56] References Cited

U.S. PATENT DOCUMENTS

| | | | |
|---|---|---|---|
| 3,806,254 | 4/1974 | Ha et al. | 250/237 G |
| 3,852,714 | 12/1974 | Carson | 250/209 |
| 4,074,128 | 2/1978 | Harris et al. | 250/231 SE |
| 4,078,173 | 3/1978 | Fultz | 250/205 |
| 4,097,731 | 6/1978 | Krause et al. | 250/205 |
| 4,203,032 | 5/1980 | Haunstetter et al. | 250/205 |
| 4,224,514 | 9/1980 | Weber | 250/231 SE |
| 4,516,177 | 5/1985 | Moon et al. | 360/77 |

*Primary Examiner*—David C. Nelms
*Attorney, Agent, or Firm*—Harrison, Harrison & Eakin

[57] ABSTRACT

In an optical encoder with a single light source, an array of a plurality of spaced photodetectors formed on a common substrate, a reticle disposed in fixed position relative to said photodetector array, and a scale of alternating translucent and opaque regions relatively moveable between said light source and said reticle so as to cause said array to provide a plurality of phase related analog signals whose amplitudes vary with the position of said scale, an improved digital automatic gain control is disclosed. A digital switch selects one of said analog signals and an analog to digital converter converts and puts out the selected signal as a digital value. A programmed microprocessor reads each such digitized signal, determines the signal value corresponding to maximum light transmission, compares said value with a nominal reference value, and computes a correction value therefrom. The microprocessor stores said correction value and thereafter puts it out as a digital value to a digital to analog converter which converts it into an analog electrical signal. An amplifier drives said light source in accordance with each said analog electrical signal, so that the optical encoder operates said single light source to yield a light value which has been digitally measured and corrected to a nominal value for each photodetector of said array.

16 Claims, 9 Drawing Figures

OPTICAL ENCODER WITH DIGITAL GAIN COMPENSATION CONTROLLING SOURCE INTENSITY

BACKGROUND OF THE INVENTION

This invention relates generally to optical encoders used for sensing the movement and position of a moveable member relative to a fixed reference. More particularly, this invention relates to digital automatic gain control and position sensing circuitry and methods which increase the accuracy and reliability of an optical encoder while eliminating the need to calibrate or trim the encoder manually in a manufacturing step.

Optical position encoders capable of converting mechanical relative position into electrical signals are known in the art. Such devices are commonly employed as position sensors in servomechanisms such as those used for positioning print wheels in printers or read/write heads in rotating disk data storage devices, such as described in the common assignee's U.S. Pat. No. 4,396,959.

Optical encoders generally comprise one or more light sources, a photodetector array with a plurality of photodetectors, a fixed mask, and a moveable scale. The moveable scale operates in concert with the fixed mask and the light source(s) to produce one or more light beams which alternate continuously between minimum and maximum intensity with the movement of the scale. Each light beam is directed towards a photodetector which translates the varying light pattern into a correspondingly varying electrical signal. In a polyphase encoder, the phase of a signal produced by a given photodetector relative to a signal produced by another photodetector of the array is determined by the relative positions of the light transmissive slots in the fixed mask over the photodetectors. The frequency and/or slope of the signals can be used to ascertain the speed at which the scale is moving, and the signal amplitude values can be monitored to determine scale position relative to the mask.

An initial problem which must be overcome in all polyphase optical encoders is the variation in minimum and maximum electrical signal characteristics among the plurality of photodetectors as they are installed. The signal put out by each photodetector will be influenced by at least three factors: variations in ambient operating temperature, the individual electrical characteristics of each photodetector, and the amount of light which reaches each photodetector. The latter factor will vary with the physical installation of the light source(s) and, if more than one light source is employed, with the light emitting characteristics of each source.

In one prior patent, U.S. Pat. No. 4,224,514, to Weber et al. describing an optical encoder, the initial variations in electrical signals are eliminated following assembly of the encoder by using a laser trimmed preamplifier. A thick film resistor, used to control the gain of a separate preamplifier for each photodetector, is suitably trimmed to adjust the peak signal put out to a predetermined level. Variations produced by multiple light sources are eliminated in this apparatus by an arrangement which requires that a single light source be used.

Each unit produced according to this prior design must undergo an adjustment step following assembly, and the adjustment becomes a fixed operating characteristic of each unit so produced. It will thus be appreciated that an optical encoder which is self-trimming would have the double advantage of eliminating the intial adjustment step and providing for continued accuracy of the encoder over the useful life of the components. This is a salient contribution of the present invention.

A second problem to overcome in optical encoders is the variation in minimum and maximum electrical signals caused not by movement but by the stress of operation. Specifically, the light output of an LED light source will generally drop as the apparatus within which the light source is installed warms to operating temperature, causing a corresponding drop in photodetector output of e.g. 20%. This problem is most pronounced when the optical encoder output is relied upon by the control circuits of a servomechanism to hold the servomechanism at a given position, since any signal variation will be interpreted as relative movement. One method is disclosed in the above described Weber et al. patent, wherein the moveable scale, the mask, and the photodetectors are arranged so as to cause the electrical signals always to sum to a constant value. The output of the light source can then be regulated by automatic gain control (AGC) circuitry to maintain the summed signal within tolerance of a reference value. This solution, however, does not compensate for individual variations in the photodetector signals which may develop over time, and may require multiple photodetectors (for the summing effect) to produce one signal.

A different AGC capability is disclosed in U.S. Pat. No. 3,806,254, to Ha and Ruble, et al., wherein an apparatus is described which provides AGC for both the minimum and maximum peaks of the electrical signal produced by an individual photodetector. This technique employs two reference signals corresponding to the nominal minimum and maximum values of the photodetector signal, and a switching means used to select the proper reference signal for the AGC function at the proper time. The minimum peak approaches but never reaches a zero value, thus providing for a positive AGC even at the minumum signal peaks. The AGC function is effectively inoperative between signal peaks, however, rendering this design useful only for applications which rely solely on signal peaks for position information. Continuous, individual AGC over the entire waveform of each signal produced by the photodetectors of an optical encoder would render intermediate signal values useful as a source of continuous position information as well. Such continuous AGC is a second contribution of the present invention.

SUMMARY OF THE INVENTION

One general object of the present invention is to provide an optical encoder which overcomes the limitations and drawbacks of the prior art approaches.

Another principal object of the present invention is to provide an optical encoder which does not require an adjustment step for electrical trimming in the manufacturing process used to produce the encoder.

A further object of the present invention is to provide an optical encoder which is continuously, automatically selftrimming, and which therefore compensates for electrical variations in the components of the encoder as such variations may develop over time.

One more important object of the present invention is to provide an optical encoder which has individual automatic gain control capability for each photodetector in the encoder over the entire range of signal values produced by the photodetector, thus rendering each such signal a reliable source of position and movement information over its entire range of values.

These objects are accomplished in an optical encoder which employs a single light source in combination with a moveable scale, a fixed mask, and a plurality of photodetectors to generate two polyphase signals and a reference signal. A microprocessor with an initial calibration routine provides the ability to adjust the light source individually for each photodetector to set its output to a nominal value. The adjustment value for each photodetector and the value of the reference signal are stored by the microprocessor as part of the initial calibration routine. During operation, the microprocessor continuously compares the reference signal with its stored initial value and computes any difference which may develop over time. As each photodetector is selectively polled by the microprocessor, the light source is adjusted by a value computed by summing the calculated difference in the reference signal and the initial calibration value for the particular photodetector, thereby compensating for any signal drift indicated by variation in the reference signal. The microprocessor can optionally derive continuous position information using the two polyphase signal values in a table look-up routine, wherein a signal value is translated into a precise position.

The method of the present invention for providing digital automatic gain control in an optical encoder including a single light source, an array of a plurality of spaced photodetectors formed on a common substrate, a reticle disposed in fixed position relative to the photodetector array, and a scale of alternating translucent and opaque regions relatively moveable between the light source and the reticle so as to cause the array to provide a plurality of phase related analog signals whose amplitudes vary with the position of the scale, comprises the steps of:

setting the light output of the light source to a predetermined level;

selecting in turn the analog signal put out by each photodetector of the array in response to the light output of the light source;

digitizing the selected analog signal to provide a digital value;

moving the moveable scale in relation to the light source, the reticle, and the photodetector array;

monitoring the digitized analog signal as it changes with the relative movement of the scale to determine when the digitized analog signal has reached a value which corresponds with the maximum output of the photodetector;

determining a correction to the pre-determined setting of the light output of the light source such that the corrected setting will produce an analog signal from the selected photodetector which, when digitized, is equal in value to a predetermined digital reference value;

storing the light-source correction setting;

thereafter driving the light source at the corrected setting whenever the selected photodetector is again selected by the microprocessor.

The method may comprise the further steps of:

digitizing the analog signal of a photodetector of the array disposed so as to be in constant full exposure to the light source;

storing the digitized signal as an original reference value;

thereafter digitizing at predetermined intervals the analog signal of the fully exposed photodetector to provide a sample value;

computing the difference between the stored reference value and the subsequent sample value, which difference is then used to compute a new correction value for each switched signal by applying the difference to each stored correction value.

The method may also include the step of deriving refined position information from the digitized values of the analog signals produced by the photodetectors of the array by using the digitized values in a table look-up routine, whereby a given digitized value is translated into a relative position value.

These and other objects, advantages, and features of the present invention will be further understood and appreciated from a consideration of the following detailed description of a preferred embodiment, presented with the accompanying drawings.

DETAILED DESCRIPTION OF A PREFERRED EMBODIMENT

The optical encoder system herein described generates two polyphase signals to provide continuous position information to a microprocessor. The microprocessor, operating under control of a computer program, digitally trims the encoder output with reference to a base value, and makes use of the trimmed output to provide digital control of a servomechanism.

Figure 1:
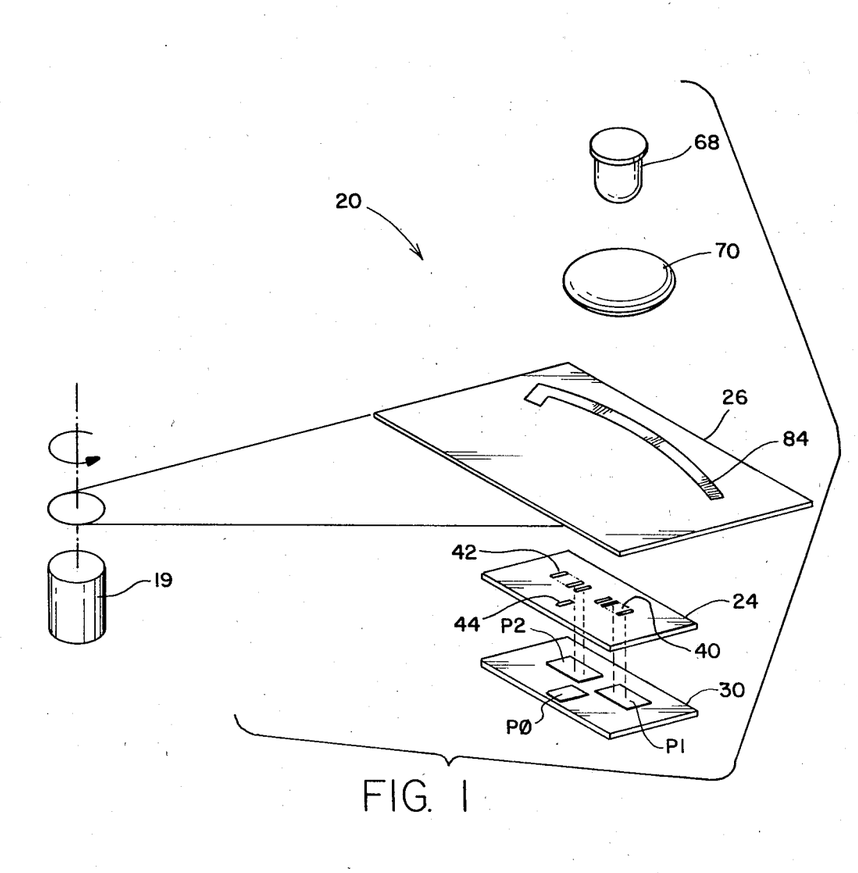
FIG. 1 presents a conceptual illustration of the major components of the optical encoder 20.

A conceptual illustration of the preferred embodiment of the present invention is presented in FIG. 1. Individual structural components of the preferred embodiment are illustrated in FIGS. 2, 3, 4, 5, and 6.

Figure 3A:
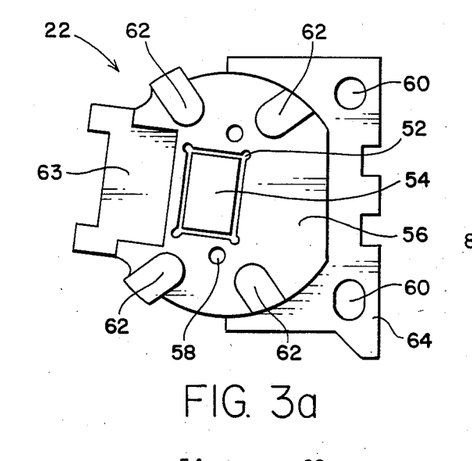
FIG. 3 is an orthogonal projection of the top (FIG. 3a) and side (FIG. 3b) views of the bottom member 22 of the optical encoder 20.
Figure 3B:
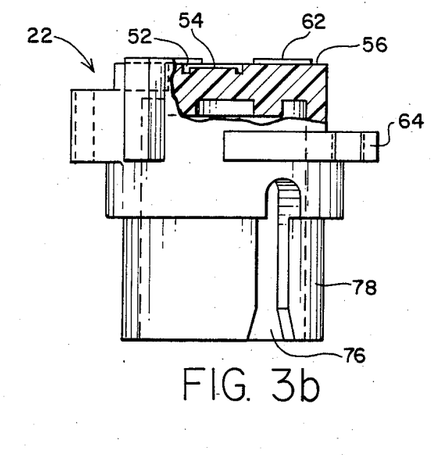
Figure 4:
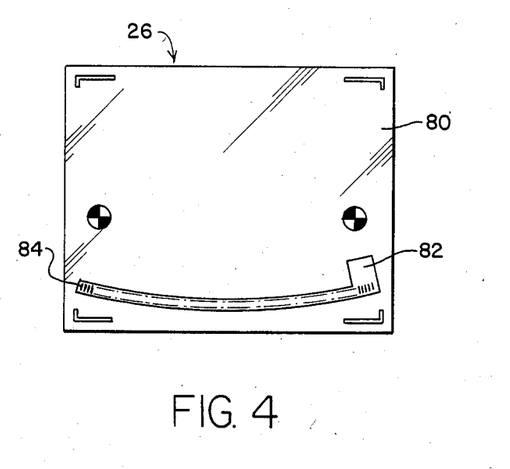
FIG. 4 is an illustration of the moveable scale 26.

Optical encoder 20 comprises top member 28 (FIG. 2), bottom member 22 (FIG. 3), and moveable scale 26 (FIGS. 1 and 4). Top member 28 and bottom member 22 are formed of injection molded thermoplastic and are generally cylindrical in shape. Top member 28 has a back wall 74 with two pin-like protrusions 72 which mate during assembly wih two aligned recesses 60 formed in shelf 64 of bottom member 22. Bottom member 22 and top member 28 are glued together with a suitable adhesive at the commonly contacting portions of their respective back wall and shelf, at and adjacent to pins 72 and recesses 60.

Figure 2A:
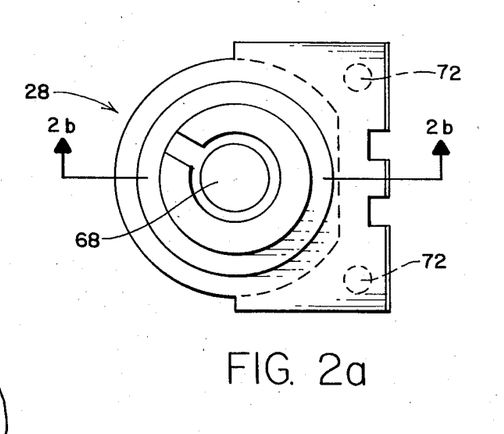
FIG. 2 is an orthogonal projection of the top (FIG. 2a) and side (FIG. 2b) views of the top member 28 of the optical encoder 20.
Figure 2B:
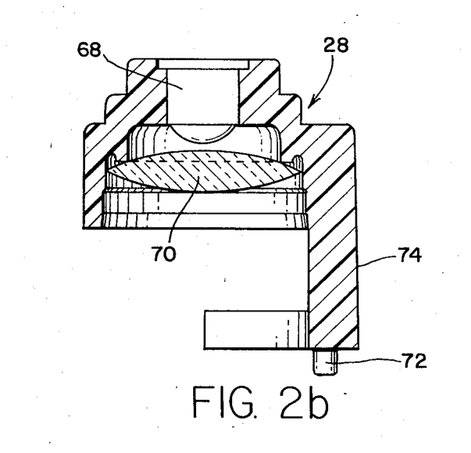

LED 68 and lens 70 are mounted in top member 28 and are glued in place with a suitable adhesive.

Included in top surface 56 of bottom member 22 is well 52, illustrated in FIG. 3. Within well 52 is platform 54, the top of which platform is below the level of surface 56. Well 52 is made to receive and align photodiode array 30 (FIG. 6), which array is mounted on platform 54 and glued in place with a suitable adhesive. Fine wires (not shown) are bonded between connection pads on photodiode array 30 and miniature printed circuit board 32 (FIG. 7), which board is mounted and glued on shelf 63 of bottom member 22. A four-conductor cable (not shown) provides a structurally rugged connection between printed circuit board 32 and the other electrical components of the encoder system.

Figure 6:
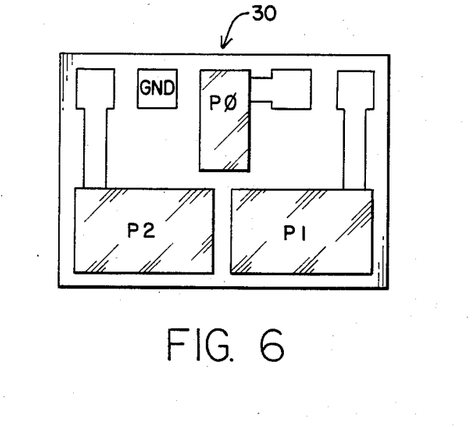
FIG. 6 is an illustration of the photodiode array 30.
Figure 7:
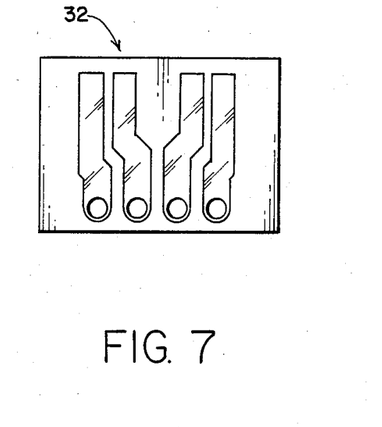
FIG. 7 is an illustration of the miniature printed circuit board 32.

Photodiode array 30, illustrated in FIG. 6, comprises three photodiodes P1, P2, and P0 formed on a common substrate. Photodiodes P1 and P2 are formed along a common longitudinal axis, and photodiode P0 is formed adjacent to the boundary which separates photodiodes P1 and P2.

Reticle 24 (FIG. 5), comprises a thin, transparent glass sheet on which an opaquing material is selectively deposited so as to create light transmissive slot arrays 40 and 42, and a single index slot 44. Alignment rings 46 and alignment windows 48 are also formed in the opaque background 50.

Figure 5:
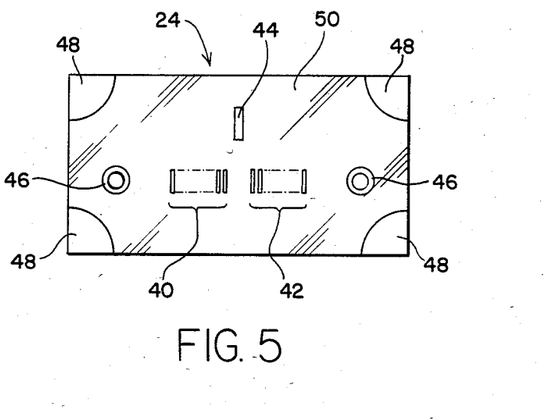
FIG. 5 is an illustration of the reticle 24.

Reticle 24 is mounted directly above photodiode array 30 on four raised segments 62 disposed generally at the four corners of bottom member 22. The light transmissive slot arrays 40 and 42, and the single slot 44 in reticle 24 are carefully aligned over photodiodes P2, P1, and P0 of photodiode array 30, respectively, by placing the alignment rings 46 in exact superimposition over alignment holes 58 in bottom member 22. Slot arrays 40 and 42 each comprise a set of e.g. 10 equidistant parallel openings. Slot 44 comprises a single opening for an index, such as track zero in a disk drive. Reticle 24 is secured at its four corners with a suitable adhesive which bonds it onto the raised segments 62 at common locations of contact.

Scale 26 is a thin glass sheet on which silver is selectively deposited to form opaque radial microlines 84. Scale 26 is glued to the moveable carriage of an electromechanical servomechanism 19 and is positioned within the U-shaped cavity in the encoder 20 formed by the joining of top member 28 and bottom member 22 so that microlines 84 are in optical registration with each set of slots 40 and 42 of the reticle 24 throughout the locus of movement of the scale 26 relative to the fixed light source 68 and reticle 24.

Slots 76 are formed in the cylindrical base portion 78 of bottom member 22 to enable the encoder 20 to be clamped to a fixed base casting by attachment to a cylindrical vertical post (not shown). A clamp (not shown) around slotted cylindrical base portion 78 secures the encoder 20 to the post. The base portion 78 defines an interior cylindrical chamber which is deeper than the post, leaving a vertical gap to provide an adjustment range to accomodate vertical alignment of the encoder. Should realignment of the encoder 20 be required during final checkout or maintenance, such is easily accomplished by releasing the clamp, readjusting the encoder 20, and retightening the clamp. Release of the clamp is thus seen to facilitate both vertical and horizontal-rotational alignment of the encoder assembly 20.

In operation, light is emitted from LED 68 towards bottom member 22 and is focused and collimated by lens 70. The current levels at the photodiodes of array 30 increase with an increase in light, causing a corresponding decrease in the analog voltage signals to a programmed microprocessor 100.

Scale 26 acts in combination with reticle 24 alternately to block and to permit transmission of light from LED 68 to each photodiode in photodiode array 30. Photodiodes P1, P2, and P0 in photodiode array 30 respond to the alternating patterns of light and dark generated by the relative movement of scale 26 with respect to reticle 24 by producing electrical signals with the waveform characteristics depicted in FIG. 9.

Figure 9:
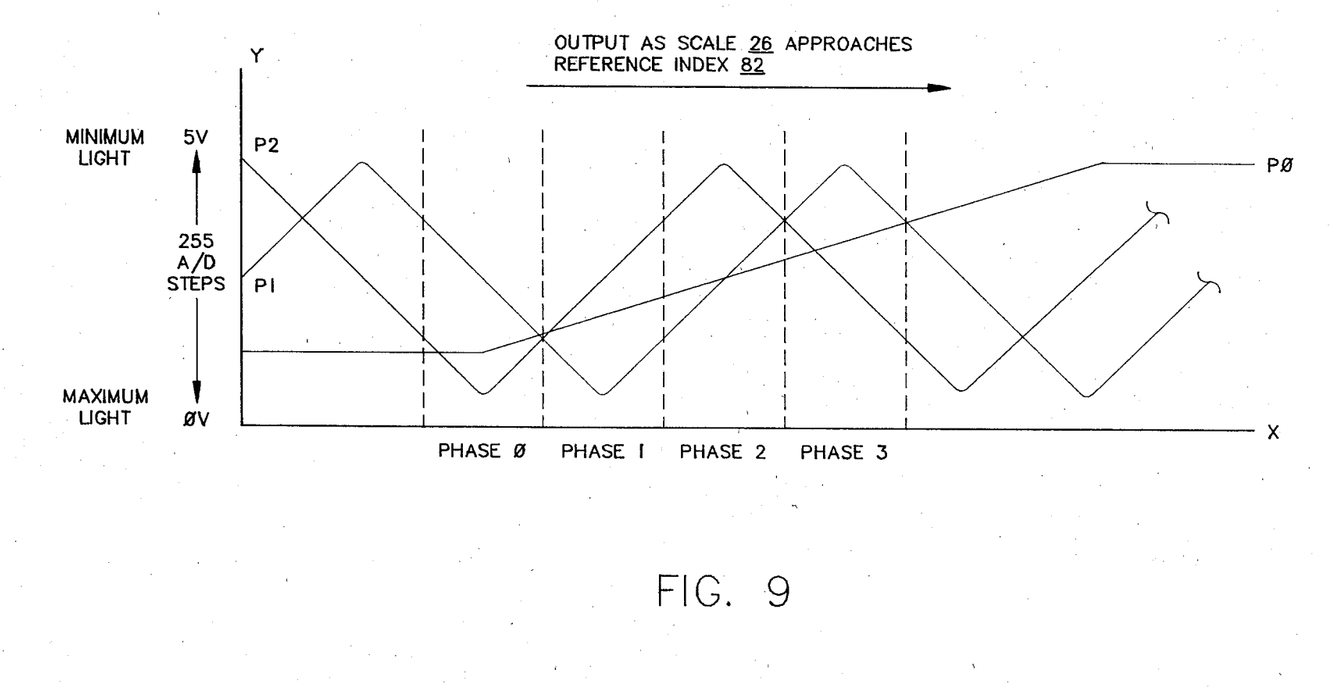
FIG. 9 is a waveform diagram which illustrates the waveforms of the electrical signals produced by the P1, P2, and P0 photodiodes during operation of the optical encoder 20.

The X-axis in the FIG. 9 diagram represents the relative position of the servomechanism to which scale 26 is attached, and the Y-axis represents the output voltage level of the P1, P2, and P0 photodiodes. The maximum peaks of the P1 and P2 waveforms depicted in FIG. 9 represent minimum light levels, and the minimum peaks represent maximum light levels. Slot arrays 40 and 42 are 90 degrees out of phase with one another relative to the periodic spacing between the radial microlines 50 of scale 26, so that the electrical signals produced by photodiodes P1 and P2 are in phase quadrature.

As is evident from the diagram, the signals produced by the P1 and the P2 photodiodes vary as a non-linear substantially triangular cyclical function of the relative position of the servomechanism, providing information to the servomechanism control circuitry as to the actual relative position and movement of the servomechanism. The signal from the P0 photodiode provides a portion invariant reference except when opaque index region 82 on scale 26 is aligned with the opening 44 for the P0 photodiode. Light from LED 68 reaches the P0 photodiode on the array 30 except when the scale 26 is at its left limit and the opaque region 82 blocks slot 44, thereby indicating that the servomechanism has reached an index position, such as track zero in the environment of a rotating disk data storage device.

The P1 and P2 signals can be logically divided into four phases which repeat throughout the waveform with the relative movement of the servomechanism. The phases are marked in FIG. 9 as phase 0, phase 1, phase 2, and phase 3. Phase 0 is arbitrarily defined as the negative slope of the trailing (P1) signal as the servomechanism 19 rotates clockwise. Phase 0 and 2 represent the most linear portions of the signal generated by the P1 photodiode, and further represent the non-linear or peak portions of the signal generated by the P2 photodiode; and phases 1 and 3 represent the most linear portions of the signal generated by the P2 photodiode and the peak portions of the signal generated by the P1 photodiode. Signal phase is significant because precise control of the servomechanism can be achieved only when a signal exists which varies as a linear function of the relative movement of the servomechanism. Once the optical encoder 20 has been calibrated, phase crossover points are known and the microprocessor 100 switches between the P1 and P2 signals with the movement of the servomechanism as required.

The slots in reticle 24 and the radial lines in scale 26 are calibrated so that the physical distance represented by the change in electrical signals from one peak value to the next is a known value. The distance chosen is generally associated with a significant event in the apparatus in which the optical encoder 20 is installed, such as arrival of a print wheel at a print strike position, or arrival of a rotating disk transducer head at a data track. In its simplest embodiment, the optical encoder 20 system may be employed to calculate relative position by counting signal peaks.

Should a more precise determination of position be required than is provided by the comparatively rough signal peak calculation, microprocessor 100 may include a pre-defined table whereby a range of signal values is associated with a range of relative position values. Signal peaks are again used to calculate incremental position, but the incremental calculation is further refined by using the linear signal associated with a given signal peak to select a table value to be added or subtracted from the calculated value. Recognizing that a given phase encompasses a range of positions on both sides of a signal peak, it is necessary to store in the table a range of positions for only one side of the signal peak. The linear signal associated with the phase can then be biased to gain entry to the table, and the decision whether to add or subtract a given table value is based on the value of the linear signal with respect to the signal phase. A table which contains e.g. 64 entries can thus be seen to resolve a single phase into 128 equidistant segments, and to resolve one complete cycle (consisting of four phases) into 512 such segments.

Electrical Description

Figure 8:
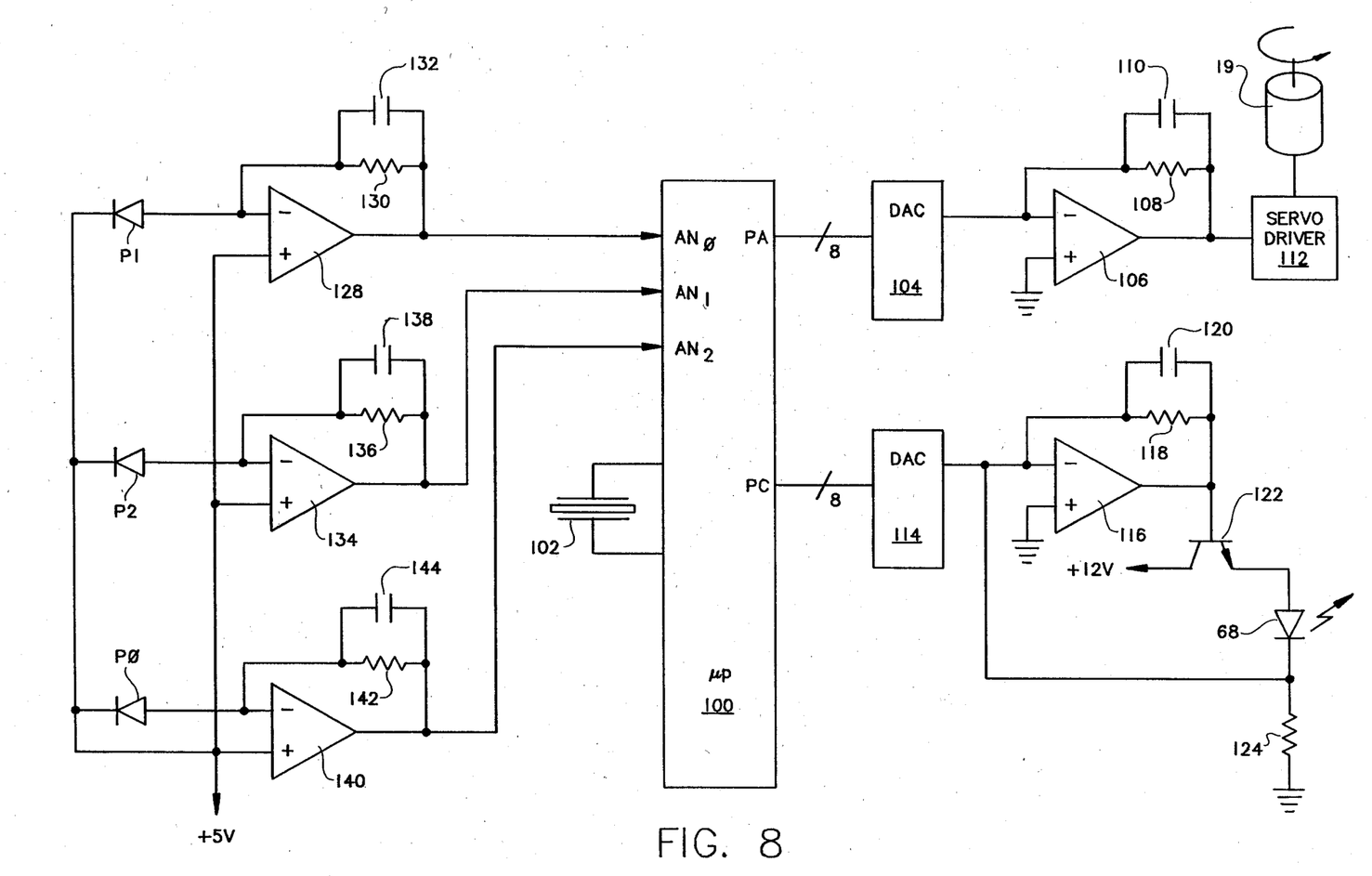
FIG. 8 is a circuit diagram which illustrates selected major components of the electrical circuitry employed in the optical encoder 20.

A detailed illustration of the circuitry of the optical encoder is set forth in the FIG. 8 circuit diagram.

Crystal 102 sets the clock frequency of the microprocessor 100. It will be appreciated that the position resolution which may be achieved by optical encoder 20 is dependent upon the relation between the signal sampling rate of microprocessor 100 and the frequency of the signals emitted by the P1 and P2 photodiodes. Sampling rate is determined by the cycle time of microprocessor 100, which in turn is determined by the characteristics of both the microprocessor and crystal 102. These components must be chosen so that microprocessor 100 is able to sample and process the P1 and P2 signals at least three times per cycle at the greatest possible signal frequency, i.e., when the servomechanism 19 is moving most rapidly. This provides only the minimum resolution necessary for reliability; greater resolution is achieved with higher sampling rates and at slower servomechanism speeds.

The microprocessor 100 puts out eight bit data words at ports PA and PC to control the torque of the servomechanism 19 and the light output of LED 68, respectively. Each eight bit data word has a range of 256 values (0-255).

In the LED driver circuit, the eight bit digital value is converted by digital to analog converter 114 to a current level between zero and a reference current in 256 equal steps. Said current is put out to operational amplifier 116 for which resistor 118 sets the gain and capacitor 120 provides the compensation. The output of operational amplifier 116 is further amplified by a driver transistor 122 which is connected to drive LED 68 through a current limiting resistor 124.

Control of the servomechanism 19 is accomplished through eight bit digital to analog converter 104, which sets a current between zero and a reference current in equal steps between 1 and 256 according to the digital value put out by microprocessor 100 at port PA. Said current is put out to operational amplifier 106 for which resistor 108 sets the gain and capacitor 110 provides the compensation. Servo driver circuit 112 is connected to operational amplifier 106 and is designed so that a predetermined median current put out by operational amplifier 106 will cause a no-torque condition, and any variation from the median will cause a corresponding clockwise or counterclockwise torque in the servomechanism 19, depending on the direction of the variation. Torque increases with an increase in current variation from the median level.

The P1, P2, and P0 diodes of the photodiode array 30 are connected to three operational amplifiers 128, 134, and 140. Three resistors 130, 136, and 142 are connected from output to input of the operational amplifiers 128, 134, and 140 to establish a very high gain factor for each. Three capacitors 132, 138 and 144 bridge three resistors 130, 136, and 142, respectively, to stabilize and compensate the operational amplifiers 128, 134, and 140. The outputs of the operational amplifiers are connected to three multiplexed analog inputs AN0–AN2 of microprocessor 100. Those inputs are connected sequentially to an internal analog-to-digital converter within microprocessor 100, which may be e.g. Type 6805R3 made by Motorola, or equivalent.

Encoder Calibration

The microprocessor 100 digitally controls the amplitude of the LED source 68 in the optical encoder 20 by commanding the driving current put out by the LED driver circuit. When the digital word sent to LED DAC 114 is increased, the LED driver circuit causes LED 68 to put out more light; when the digital word sent to LED DAC 114 is decreased, the LED driver circuit causes LED 68 to put out less light. The current level at the photodiodes P1 and P2 is determined by the amount of light received by each photodiode. By controlling the LED light amplitude individually for each photodiode when the signal from that photodiode is "read" by microprocessor 100, microprocessor 100 can digitally compensate for differences in light sensitivities of the photodiodes P1 and P2 of the array 30 without any need for electrical trimming by external means, which was required by prior art quadrature encoders. Microprocessor 100 calculates compensation values for the P1 and P2 photodiodes in the encoder calibration routine.

The automatic gain control system calibrates only the two minimum peaks which represent maximum light transmission. Experience has shown that the signal variation between the P1 and P2 photodiodes is due largely to variation in the amount of light which reaches each photodiode. Signal variations due to dissimilarities in electrical characteristics of the two photodiodes is held to a minimum by forming them on a common substrate. Since the maximum peak values represent effective no-light conditions, there is no need to calibrate the light source for the maximum peak values. These maximum peak values are, however, read and stored for reference by microprocessor 100.

Microprocessor 100 digitally calibrates optical encoder 20 as follows:

On power-on, microprocessor 100 sends a pre-determined digital word to LED DAC 114 to establish the initial light output of LED 68. The microprocessor then commands movement of the servomechanism 19 while sampling the outputs of photodiodes P1 and P2. The P2 peak is digitized in microprocessor 100 and compared with a preset nominal peak value. If the actually read peak amplitude for P2 is not equal to the nominal peak value, the LED current is changed in the direction likely to render the P2 amplitude equal to the nominal value. Microprocessor 100 then commands a second movement of the servomechanism 19 through the peak (window fully open) P2 position and re-reads the amplitude of P2. This procedure is repeated until a correction value is determined which renders the P2 amplitude equal to the nominal value. The calibration step is then repeated for the P1 amplitude. The correction values for P1 and P2 are stored in internal memory locations of microprocessor 100 and are recalled whenever P1 or P2 is selectively read during system operation.

P0 minimum peak amplitude is also read and stored during the calibration routine as a reference value. As the temperature within the apparatus housing the optical encoder 20 increases, experience has shown that the light output of LED 68 will diminish. During operation, the microprocessor 100 periodically compares the actual amplitude of the P0 diode with the initial stored reference amplitude. If drift occurs, microprocessor 100 recalculates the pre-stored compensation values for P1 and P2 in accordance with any measured drift in light level as measured at the diode P0. The optical encoder system therefore compensates not only for signal differences inherent in the two photodiodes P1 and P2, but also compensates for signal drift which occurs during operation caused by variation in the light output of LED 68.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departing from the spirit and scope of the invention. The disclosures and the description herein are purely illustrative and are not intended to be in any sense limiting.

We claim:

1. In an optical encoder including a single light source, an array of a plurality of spaced photodetectors formed on a common substrate, a reticle disposed in fixed position relative to said photodetector array, and a scale of alternating translucent and opaque regions relatively moveable between said light source and said reticle so as to cause said array to provide a plurality of phase related analog photodetector signals whose values vary with the position of said scale, an improved digital automatic gain control system comprising:
  programmed digital controller means including digital switch means for selecting among said analog signals, analog to digital converter means connected to the output of said switch means for digitizing and putting out each selected signal as a digital value, and further including processing means for reading each said digitized selected signal and for determining a known reference point, for comparing said known reference point with a nominal reference value and for computing a correction value therefrom, for storing said correction value for each selected signal and for thereafter putting out said correction value as a digital value when the corresponding analog photodetector signal is selected;
  digital to analog converter means for converting each digital value put out by said controller means into an analog electrical signal; and
  amplifier means connected to said digital to analog converter means and to said single light source to drive said light source in accordance with the analog drive signal corresponding to the selected analog photodetector signal.

2. An optical encoder as set forth in claim 1, wherein said controller means stores an original digital reference value derived by digitizing the analog signal of a photodetector of said array disposed so as to be substantially in constant full exposure to said light source, and at predetermined intervals thereafter samples the digitized value of said fully exposed photodetector as a sample value and computes the difference between the stored reference value and the subsequent sample value, which difference is then used to compute a new correction value for each selected signal by applying said difference to each stored correction value.

3. An optical encoder as set forth in claim 2, in which said digitized reference value is derived from a photodetector of said array disposed so as to be in full exposure to said light source except when disposed at a reference position of said scale.

4. An optical encoder as set forth in claim 1 and further including means for putting out an output signal indicative of the relative position of said scale and the array, and said controller means further includes lookup table means for deriving refined relative position information from the digitized values of the analog signals produced by the photodetectors of said array by looking up said digitized values in accordance with a table look-up routine and translating a given digitized value is into a relative position value.

5. A method for providing digital automatic gain control in an optical encoder including a single light source, an array of a plurality of spaced photodetectors formed on a common substrate, a reticle disposed in fixed position relative to said photodetector array, and a scale of alternating translucent and opaque regions relatively moveable between said light source and said reticle so as to cause said array to provide a plurality of phase related analog photodetector signals whose amplitudes vary with the position of said scale, comprising the steps of:
  setting the light output of said light source to a predetermined level;
  selecting in turn the analog signal put out by each photodetector of said array in response to the light output of said light source;
  digitizing said selected analog signal to provide a digital value;
  moving said moveable scale in relation to said light source, said reticle, and said photodetector array;
  monitoring said digitized analog signal as it changes with the relative movement of said scale to determine when said digitized analog signal has reached a reference value;
  determining a correction to the pre-determined setting of the light output of said light source in accordance with the reference value to provide a corrected setting such that said corrected setting will produce an analog signal from said selected photodetector which, when digitized, is equal in value to a predetermined digital reference value;
  storing said light-source correction setting;
  thereafter driving said light source at said corrected setting whenever said selected photodetector is again selected by said microprocessor.

6. A method for providing digital automatic gain control in an optical encoder as set forth in claim 5, further comprising the steps of:

digitizing the analog signal of a photodetector of said array disposed so as to be in constant full exposure to said light source;

storing said digitized signal as an original reference value;

thereafter digitizing at predetermined intervals the analog signal of said fully exposed photodetector to provide a sample value;

computing the difference between the stored reference value and the subsequent sample value, which difference is then used to compute a new correction value for each switched signal by applying said difference to each stored correction value.

7. A method for providing digital automatic gain control in an optical encoder as set forth in claim 5, further comprising the steps of looking up the digitized value of the selected analog photodetector signal in accordance with a table look-up routine, and translating a given digitized value into a relative position value of the scale and the array.

8. An optical encoder as set forth in claim 1 wherein said controller means periodically compares each selected photodetector signal with the reference value and in response thereto computes and stores a modified correction value for each selected photodetector signal and thereafter puts out the modified correction value when that photodetector signal is selected.

9. The optical encoder of claim 8 wherein the selected photodetector signal is compared to the nominal reference value only when the photodetector corresponding to the selected photodetector signal is disposed to be in a predetermined level of exposure to the light source.

10. A method for providing digital automatic gain control in an optical encoder having a single light source, a plurality of spaced photodetectors, a mask disposed in fixed position relative to the plurality of photodetectors, and a scale of alternating translucent and opaque regions relatively moveable between said light source and said reticle so as to cause said plurality of photodetectors to provide a plurality of phase related analog photodetector signals whose values vary with the position of the scale comprising the steps of selecting one of said plurality of photodetector signals, digitizing the selected photodetector signal, comparing the selected photodetector signal with a nominal reference value, computing a correction value for the selected photodetector signal in response to the comparison, storing the correction value for the selected photodetector signal, providing the correction value as a digital value when the corresponding analog photodetector signal is selected, converting the digital correction value to an analog drive signal, driving the single light source in accordance with the analog drive signal corresponding to the selected photodetector signal, and repeating the above steps for each remaining one of the plurality of photodetector signals.

11. The method of claim 10 wherein the comparing step is performed only when the selected photodetector signal is at a known reference point.

12. The optical encoder of claim 1 wherein the known reference point is the signal minimum.

13. The optical encoder of claim 1 wherein the means for determining the known reference point includes means for controlling the relative movement of the scale and the reticle.

14. The method of claim 5 wherein said moving step is performed in a controlled manner.

15. The method of claim 5 wherein said reference value is a peak value of light transmission.

16. The method of claim 10 wherein the known reference point is a signal minimum or maximum.

* * * * *